United States Patent [19]

Taylor

[11] Patent Number: 5,581,402
[45] Date of Patent: Dec. 3, 1996

[54] METHOD FOR PRODUCING AN IMPROVED STEREOSCOPIC PICTURE AND STEREOSCOPIC PICTURE OBTAINED ACCORDING TO THIS METHOD

[75] Inventor: Roy Y. Taylor, Scottsville, N.Y.

[73] Assignee: Eastman Kodak Company, Rochester, N.Y.

[21] Appl. No.: 156,339

[22] Filed: Nov. 22, 1993

[51] Int. Cl.⁶ .......................... G02B 27/22; G02B 27/10; G03B 27/32; G03B 35/00
[52] U.S. Cl. .......................... 359/463; 355/22; 359/619; 352/57
[58] Field of Search .......................... 359/462, 463, 359/619; 354/112, 115; 348/42, 51, 59; 352/57; 355/22

[56] References Cited

U.S. PATENT DOCUMENTS

| | | | |
|---|---|---|---|
| 2,815,310 | 12/1957 | Anderson | 359/619 |
| 2,820,395 | 1/1958 | Rehorn | 359/464 |
| 4,740,073 | 4/1988 | Meacham | 352/58 |
| 4,852,972 | 8/1989 | Wah Lo | 359/463 |
| 4,935,335 | 6/1990 | Fotland | 359/463 |
| 5,276,478 | 1/1994 | Morton | 355/22 |
| 5,349,419 | 7/1994 | Taguchi et al. | 355/22 |

*Primary Examiner*—Paul M. Dzierzynski
*Assistant Examiner*—Audrey Chang
*Attorney, Agent, or Firm*—Gordon M. Stewart

[57] ABSTRACT

An improved stereoscopic picture, comprising:
(a) a lenticular faceplate material having a predetermined number of lenticules, the lenticules having a given pitch and a given subtended primary angle; and
(b) a photographic receiver mounted on the lenticular faceplate material and on which are recorded sets of right and left perspective views of a first pair of stereoscopic pictures, the lenticular faceplate material and the photographic receiver being aligned so that each set on the photographic receiver corresponds to an associated given lenticule of the lenticular faceplate material, the width of the sets of right and left perspective views being less than the pitch of the lenticules.

25 Claims, 6 Drawing Sheets

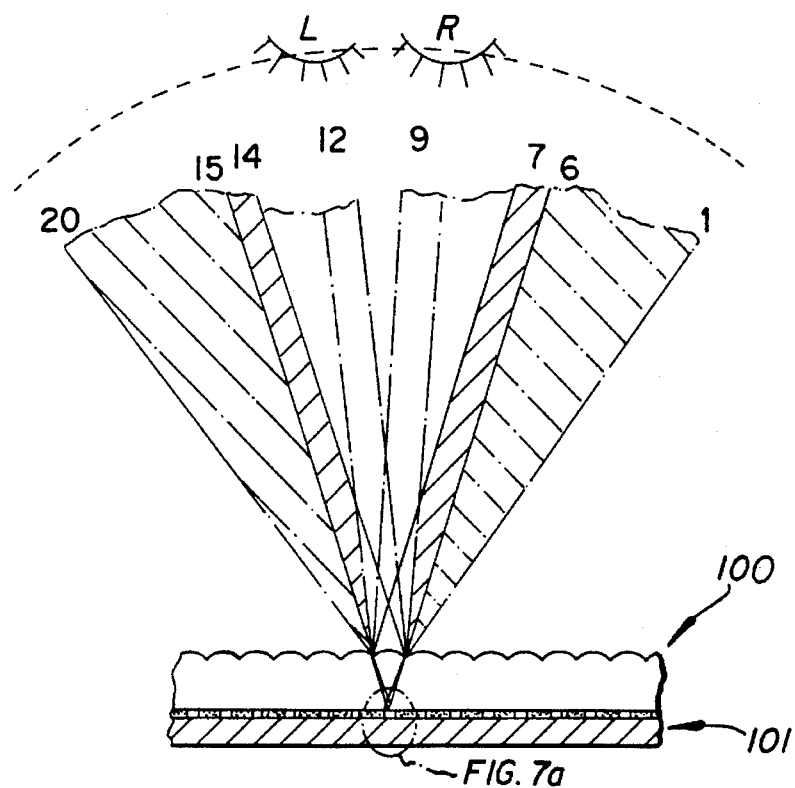
FIG. 7
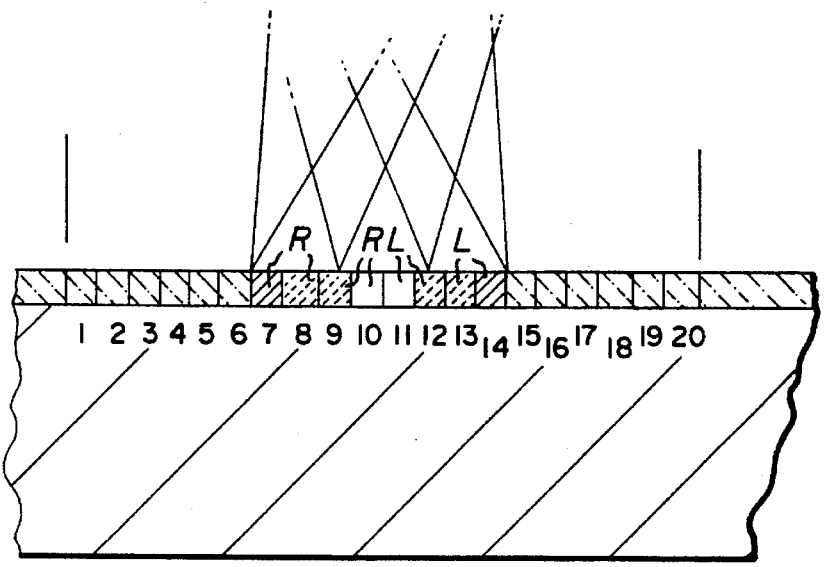
FIG. 7a
LEGEND
(See FIG. 6a)
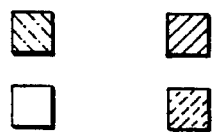

METHOD FOR PRODUCING AN IMPROVED STEREOSCOPIC PICTURE AND STEREOSCOPIC PICTURE OBTAINED ACCORDING TO THIS METHOD

CROSS REFERENCE TO RELATED APPLICATIONS

This application is related to:

U.S. application Ser. No. 08/195,231 which is a continuation of abandoned U.S. application Ser. No 722,713 filed on Jun. 27, 1991 in the name of Chase and Taylor and entitled "Electronically interpolated integral photographic system";

U.S. application Ser. No. 885,217 filed on May 19, 1992 in the name of Syracuse, Kent and Taylor and entitled "Method and Apparatus for improving electronic recording of depth images";

U.S. application Ser. No. 974,441 filed on Nov. 12, 1992 in the name of Taylor and entitled "CRT printer for lenticular photographs"; and all incorporated by reference herein.

FIELD OF THE INVENTION

The invention relates to the field of stereoscopic photographs and more particularly to a stereoscopic picture having an improved arrangement of the left and right perspective views for convenient and unambiguous viewing of stereo pairs printed on a photographic receiver (film or paper) and aligned with a lenticular faceplate for display. The invention relates also to a method for producing such a stereoscopic photograph.

BACKGROUND OF THE INVENTION

Three-dimensional photography is comprehensively described in *Three-Dimensional Imaging Techniques* by Takanori Okoshi (New York: Academic Press, 1976, translated from the Japanese edition published in 1972) which provides a basis for describing the attributes and advantages of this invention. Okoshi initially distinguishes between truly three dimensional imaging and stereoscopic imaging on the basis of the amount of information involved. The quantity of information for a stereoscopic (or binocular) image is only twice that of a planar (one-dimensional) image, is much greater information is present for a truly three-dimensional image (which is often called an autostereoscopic image). Images of the latter type are truly spatial images that gradually show more of the right side of the object when the observer moves rightward, and more of the left side of the object when the observer moves leftward (which is often referred to as a "look around" capability). Integral photography is a method of recording a complete spatial image, that is, one viewable from a multiplicity of directions, upon a single flat photographic plate. The principles of integral photography were described by G. Lippman in 1908 in a paper read to the French Academy of Science. Integral photography thus has a long history of theoretical consideration and demonstration, but has enjoyed only limited commercial success.

Integral photography refers to the composition of the overall image as an integration of a large number of small photographic image components. Each photographic image component is viewed through a separate small lens usually formed as part of a mosaic of identical spherically-curved surfaces embossed or otherwise formed onto the front surface of a plastic sheet of appropriate thickness. The plastic sheet is subsequently bonded to or held in close contact with the emulsion layer containing the photographic image components. Lenticular photography is a special case of integral photography wherein the small lenses are formed as sections of cylinders running the full extent of the print area in the vertical direction. Recent commercial attempts at lenticular photography have included a multi-lensed 35 mm three-dimensional camera sold by Nimslo Corp., Atlanta, Ga., and a similar camera manufactured by Nishika Optical Systems, a division of Nishika Corp., Henderson, Nev. Though a sense of depth is clearly visible in prints made from these cameras, the resulting images have limited depth realism and appear to the viewer to "jump" as the print is rocked or the viewer's vantage relative to the print is changed.

The product of integral photography, that is, an integral photograph, can be further thought of as an X-Y array of microscopic slide projectors cascaded over the area of the print material. Each tiny lens, or lenslet, projects a microscopic view of the scene from a slightly different perspective than the one next to it. If the viewer's eye was concentrated on a singular lenslet surface, it would see only that portion of the view behind that lenslet which is angularly aligned with the line of sight to that lenslet. If the eye is moved laterally and continues to look at the same lenslet, it will see progressively different laterally angular portions of the view behind that lenslet. However, because the lenslets are made very small relative to the normal viewing distance, their apparent angular diameters may approach or subserve the angular resolution of the eye, with the result that features of the lenslets themselves are not apparent to the viewer, while the light emanating from them is.

The viewer then is able to mentally construct the entire array of optical beams from all lenslets into a recognizable scene without distraction from lenslet features. Since the right eye sees the array from a different vantage than the left eye, autostereoscopic depth perception is also present. By shifting the head laterally relative to the print surface, a changing autostereoscopic view is seen resulting in a "look around" capability which adds to the realism of the display. Integral photography also allows a "look around" capability in the vertical direction as well as the horizontal direction and an autostereoscopic view would also result if the print were rotated ninety degrees such that horizontal lines recorded from the original scene are now extending from bottom of the print to the top.

Since it is likely that most viewers prefer to view their photographs as models or reminders of the real world, it is not likely that they will choose to rotate the print for viewing. It was recognized as early as Lippman that instead of spherical lenslets, long cylindrical lenses extending from the top of the print to the bottom could be used to provide autostereoscopic views (and resultant "look around") in the horizontal direction only. This is sufficient to give a realistic three-dimensional model of the real world. Moreover, since vertical film space is not used to record alternative vertical views, the vertical detail recorded improves and approaches the film resolution limit, giving an improved impression of print quality. The long cylindrical lenses are called lenticules, and the principles of integral photography apply equally well to lenticular photography as long as one views the layouts or optical schematics in planes perpendicular to the cylindrical axis of the lenticules.

Since there are no restrains preventing any given lenticule from projecting information recorded behind adjacent lenticules and being seen by a viewer as the print is rotated about a vertical axis or when his head is moved laterally, the recorded sequence of perspective views will be repeated in viewer space. The maximum space for information to be printed behind a lenticule without extending into the recording space of an adjacent lenticule is the reciprocal of the lenticule pitch. The angle through which this information from a given lenticule is seen is called the primary angle. The images seen to each side of the primary angle are called satellite images. The pseudoscopic viewing occurs when one eye is within the primary image region (angle) and the other eye is in the satellite region (beyond the primary angle).

An optical method of making lenticular photographs is described by Okoshi in Chapter 4 of the aforementioned book.

It was determined through magazines such as Stereo World published by the National Stereoscopic association and from museums such as the Eastman House in Rochester N.Y., that sizable collections of stereoscopic photos of historical and societal interest exist unbeknownst to the general public. As such, these photos consist of only one stereo pair and are therefore not capable of reproducing the "look around" effect (which require many laterally separated views of a scene). The earliest patent describing this general technique of stereo pair recording is U.S. Pat. No. 1,128,979 issued to Hess on Feb. 16, 1915 and which describes the simplest optical system wherein the left L and right R views of a stereo pair are placed in plate holders held at angles symmetrical to a normal surface of a sheet of cylindrical lenses 100 (See FIG. 1). The cylindrical lens elements serve to focus sections of the images onto a photographic film 101. After development, the film was presumably carefully aligned and reaffixed to the cylindrical lens sheet for viewing. The image reversal induced by the lenticules in projecting the information is compensated by printing the Right view R to the left of the Left view L.

A principal problem with this type of image display is that the viewer is free to move laterally to a position beyond the primary angle where pseudoscopic viewing occurs thereby inverting the normal depth relationships as described earlier. This is illustrated in FIG. 2 where the left eye sees the Right image (R') aligned under the adjacent lenticule 102 and the right eye sees the Left image (L) under the reference lenticule 103.

By 1978, when the Nimslo camera was developed and marketed, four views of a scene were projected, comprising two left views and two right views. The inverse perspective pseudoscopic problem had still not been solved. This is illustrated in FIG. 3. As illustrated, four views are present under each lenticule: two Right views $R_1$–$R_2$ (reference lenticule 105), $R'_1$–$R'_2$ (adjacent lenticule 106) and two Left views $L_1$–$L_2$ (reference lenticule 105), $L'_1$–$L'_2$ (adjacent lenticule 106). An observer's eyes can move laterally relative to any given reference lenticule 105, for example as an arc 110 if the print is simply tilted in the viewer's hand. There are two positions A and B close to a normal to the print where correct perspective correlation viewing is possible. At position A, the right eye sees Right image $R_1$ while the left eye sees Left image $L_2$. At position B, the right eye sees Right image $R_2$ while the left eye sees Left image $L_1$. However, if the head moves further so that position C or D is reached, pseudoscopic viewing is experienced. In position C, the right eye sees Left image $L_1$ while the left eye sees Right image $R'_2$. In position D, the right eye sees Left image $L_2$ while the left eye sees Right image $R'_1$.

U.S. Pat. No. 4,800,407 describes an optical method of making three view parallax panoramograms. The three lens camera for 3D images described in this patent is still subject to the pseudoscopic image problem.

U.S. Pat. No. 4,852,972 introduces the concept of varying the exposure of views exposed by an optical method for the purpose of compensating for the transmission losses as the angle view increases.

U.S. Pat. No. 4,807,965 recognizes the pseudoscopic image problem and corrects it by preventing the observer from seeing pseudoscopic images by utilizing a mechanical system of Louvres, a constraint that would be expensive to implement and would act as an annoyance to consumers.

U.S. Pat. No. 4,959,641 also recognizes the pseudoscopic image problem and corrects it by independently controllable and discrete light sources provided in fixed relation to a lenticular screen. The problem of such a solution lies mainly in the complexity of the system.

SUMMARY OF THE INVENTION

Accordingly, it is an object of the present invention to provide an improved stereoscopic picture as well as a new method for producing such an improved stereoscopic picture that eliminate the problems mentioned in the above discussion with respect to conventional techniques.

This object is achieved by providing an improved stereoscopic picture, comprising:

(a) a lenticular faceplate material having a predetermined number of lenticules, the lenticules having a given pitch and a given subtended primary angle; and (b) a photographic receiver mounted on the lenticular faceplate material and on which are recorded sets of right and left perspective views of a first pair of stereoscopic pictures, the sets of right and left perspective views being of a given width, the lenticular faceplate material and the photographic receiver being aligned so that each set on the photographic receiver corresponds to an associated given lenticule of the lenticular faceplate material, the width of the sets being less than the pitch of the lenticules.

It is also another object of the invention to provide a method for producing an improved stereoscopic picture, comprising the steps of mounting on a lenticular faceplate material having a predetermined number of lenticules of a given pitch and of a given subtended primary angle, a photographic receiver on which are recorded sets of right and left perspective views of a first pair of stereoscopic pictures, the sets of right and left perspective views being of a given width, the lenticular faceplate material and the photographic receiver being aligned so that each set on the photographic receiver corresponds to an associated lenticule of the lenticular faceplate material, the width of the sets being less than the pitch of the lenticules.

These and other objects of the present invention will become more apparent when taken in conjunction with the following description and drawings wherein like characters indicate like parts and which drawings form a part of the present description.

The following are advantages of the invention: it provides a very simple and inexpensive solution to the pseudoscopic image problem.

BRIEF DESCRIPTION OF THE DRAWINGS

FIG. 7 and 7a illustrate a third embodiment of the stereoscopic picture of the invention.

DETAILED DESCRIPTION OF THE PREFERRED EMBODIMENTS

Figure 2:
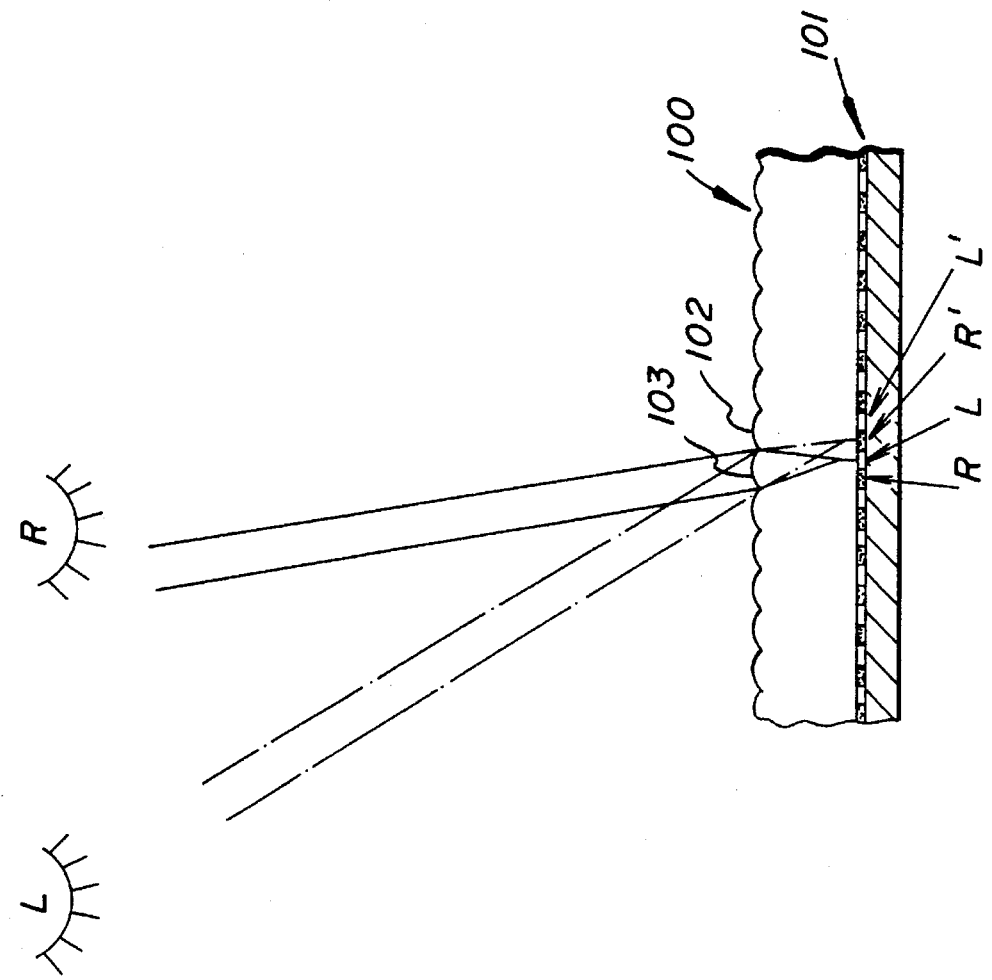
FIG. 2 illustrates the pseudoscopic image problem which occurs with the PRIOR ART stereoscopic picture of FIG. 1.
Figure 1:
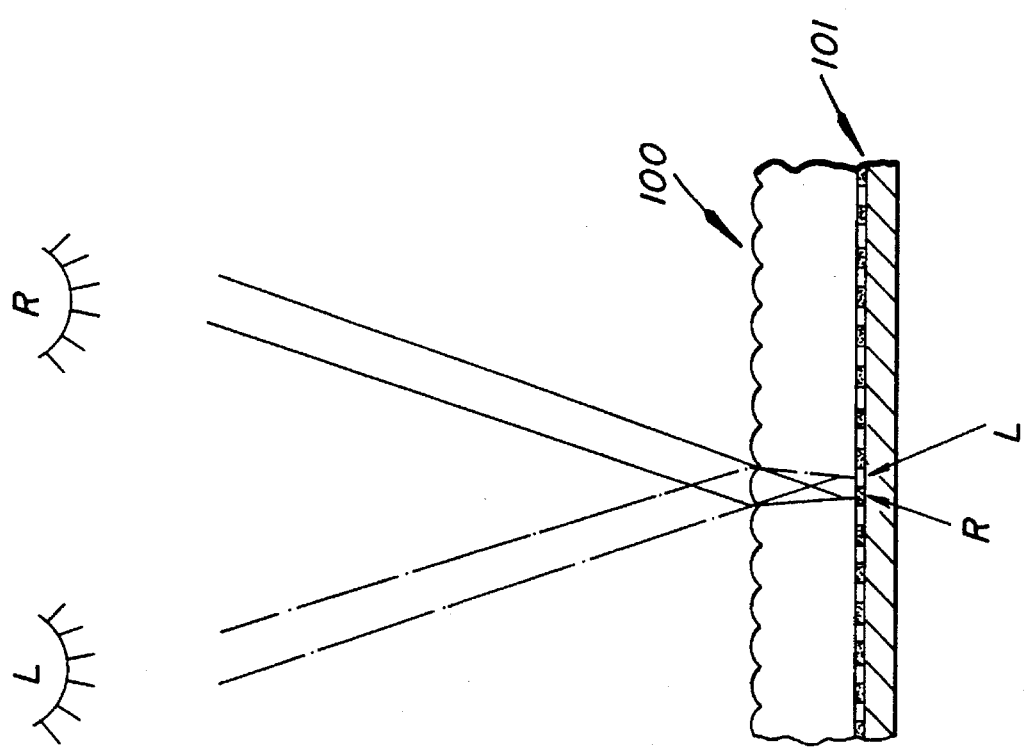
FIG. 1 represents a PRIOR ART stereoscopic picture obtained according to the teaching of U.S. Pat. No. 1,128,979.
Figure 3:
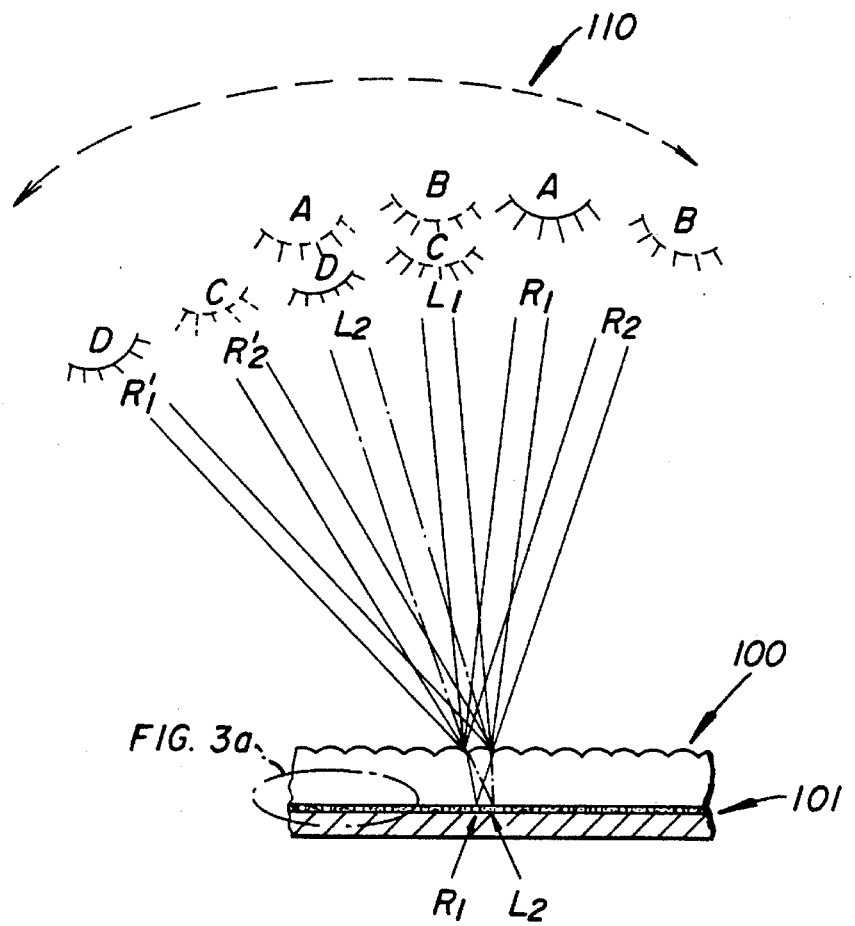
FIG. 3 and 3a represent another stereoscopic picture of the PRIOR ART.
Figure 3A:
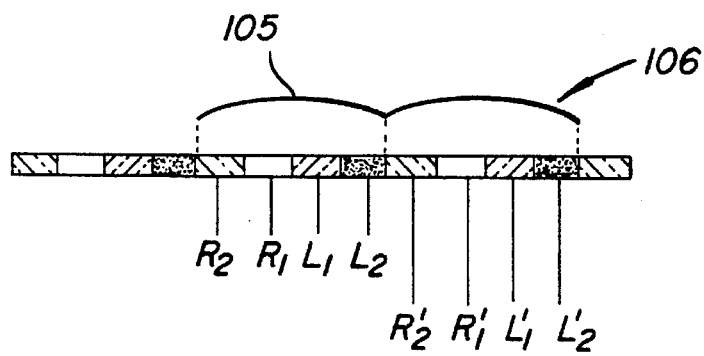
Figure 4:
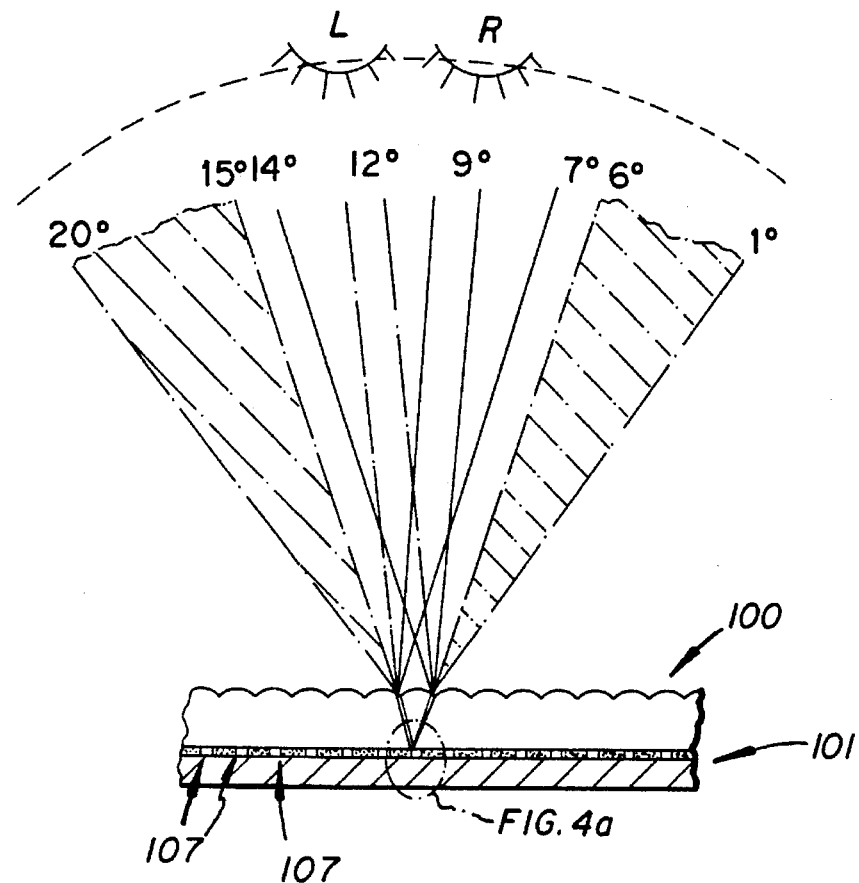
FIG. 4 and 4a represent a first embodiment of the stereoscopic picture according to the invention.
Figure 4A:
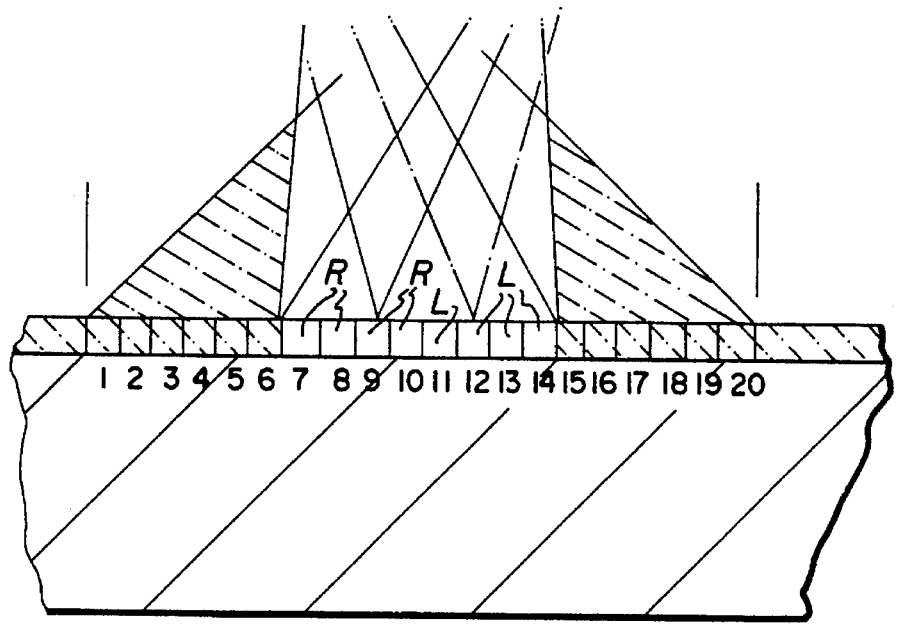

FIG. 4 to which it is now made reference illustrates a first embodiment of the stereoscopic picture according to the invention. Typically such a stereoscopic picture comprises a lenticular faceplate material 100 mounted in alignment with an image receiver 101 on which are recorded a plurality of sets 107 of right and left perspective views of a pair of stereoscopic pictures. Typically, the assemblage is made of a sheet of photographic material oriented with its emulsion side in intimate contact with the flat back side of a clear plastic sheet of appropriate thickness having lenticules embossed or otherwise formed into its front side. Alternatively, the assemblage may be comprised of a lenticular material with an emulsion coating on its rear surface.

Figure 5:
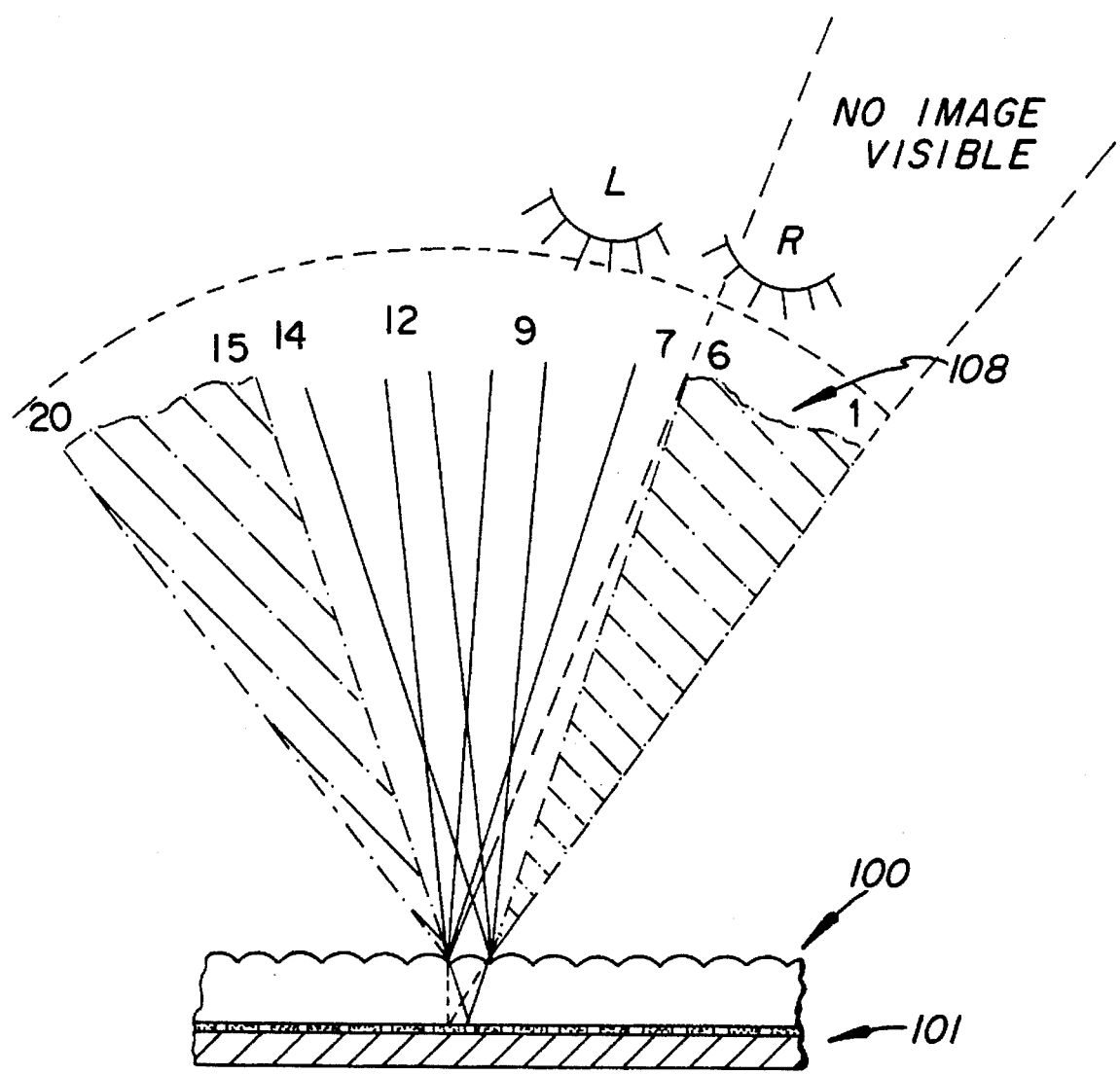
FIG. 5 is a another representation of the stereoscopic picture of FIG. 4.

According to an important feature of the invention, the image area recorded behind each lenticule, i.e. the set of right and left perspective views does not occupy the whole width of the corresponding lenticule. As an example, when printing a depth image containing 20 views (1–20) in conjunction with a lenticular sheet designed with a primary angle of 20 degrees, it was found that a simple stereo pair could be used to fill only the central five to seven recording sites (7–14) behind each lenticule while leaving the rest of film (1–6 and 15–20) unexposed so that, according to this embodiment, two successive sets of right and left perspective views of a stereo pair occupy 13 to 16 degrees and are separated by four to seven degrees of black. An alternative would be to expose the areas between recording sites with information different from the stereo pairs. For example, graphics, colors other than black, etc. Obviously, the invention is not limited to these particular numbers of exposed and unexposed views. In this particular example, observed at a viewing distance of 3 feet, the width of the black band was just at or beyond the 2.5 inches of human eye separation. Therefore, positioning the head so that pseudoscopic viewing is enabled, is extremely unlikely. This is illustrated in FIGS. 4 and 5. In FIG. 4, the viewer's head is close to a normal to the lenticular screen 100 and the left eye sees the Left image projected from sites 11, 12, 13, or 14 while the right eye sees the Right image projected from sites 7,8,9 or 10. Therefore, since the images seen by the eyes correlate with the Left and Right perspectives that originally provided the images (such as a stereo camera), correct perspective correlation viewing is enabled.

As shown in FIG. 5, if the viewer's head is moved laterally to the right (or conversely to the left), the right eye sees no image to conflict with the image still seen by the left eye image. In fact, it sees a black image 108. Since the overall impression when one eye moves into the black region, is one of diminished image brightness (as summed by the mind over both eyes), the viewer quickly associates adjusting his head laterally to a position where maximum brightness is seen, which is also the viewing zone where stereoscopic vision is enabled.

Figure 6:
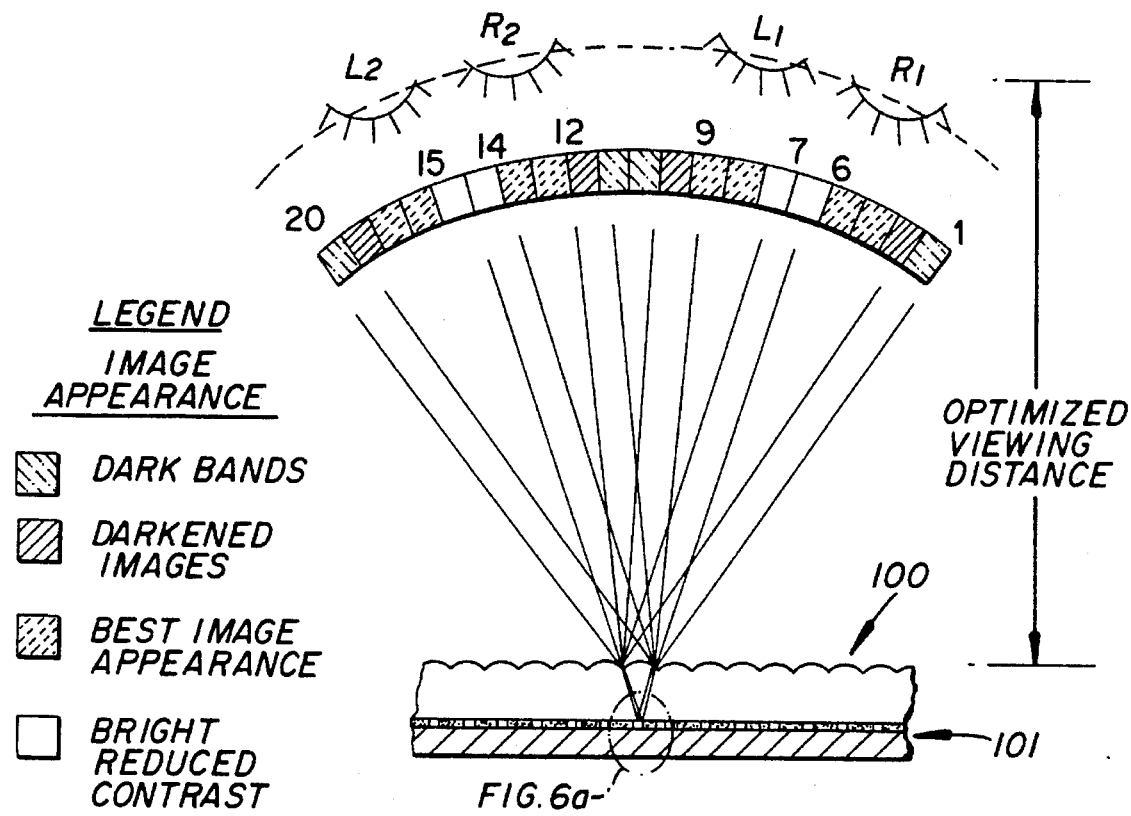
FIG. 6 and 6a show a second embodiment of the stereoscopic picture according to the invention.
Figure 6A:
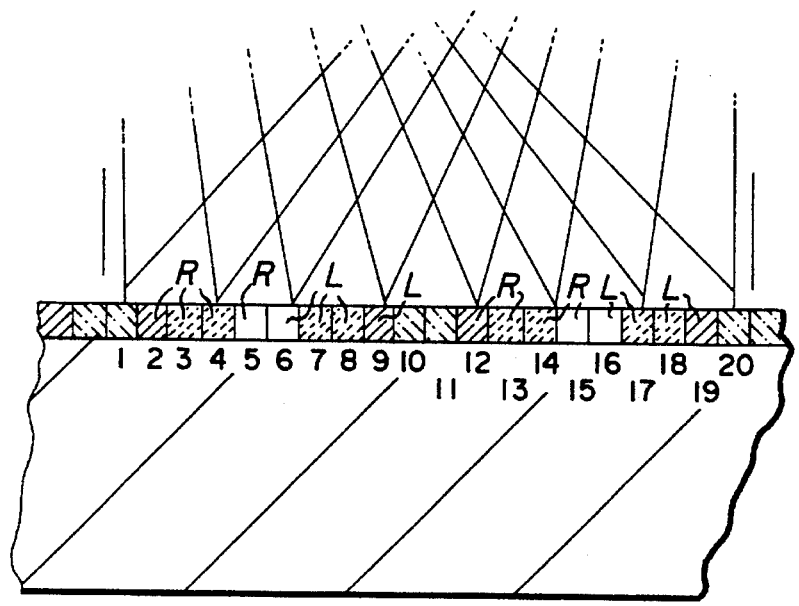

Alternatively, two successive sets of right and left views of a first stereo pair are separated by a set of right and left views of a second stereo pair, instead of a black area. As an example, the second stereo pair consists of graphics. Advantageously, such graphics include words or symbols for describing the first pair of stereoscopic pictures. Alternatively, such graphics are words or symbols used to help the viewer correctly locate the viewing zone where a correct perspective correlation is enabled. Such a feature is illustrated in FIG. 6 wherein a first stereo pair is recorded in sites 2 to 9 and a second stereo pair is recorded in sites 12 to 19. The two stereo pairs are separated by an unexposed area (dark band) corresponding to sites 10 and 11.

In order for such a technique to work optimally, the lenticular material should be preferably provided with a total subtended primary angle that is substantially greater than the angular separation of a viewer's eyes at the intended viewing distance. Preferably, such a primary angle is at least four times the angular separation of a viewer's eyes at the intended viewing distance. For example, the subtended primary angle of the lenticular material is of at least 20 degrees. Preferably, the writing technique has a resolution sufficient to permit the recording of a stereo pair within a 5 degrees portion of that primary angle.

As another feature of the present invention, the subsets of right and left perspective, views of a set of views are formed of varying brightness level views, the brightness level increasing as the viewer moves towards the viewing zone of the stereoscopic picture where a correct perspective correlation is enabled. In fact, it was determined that if the outer or lateral views of a set (See views 7 and 14; FIG. 7) are printed with reduced exposure, the resulting darker images become an additional intuitive clue to the viewer to move his head laterally in a direction making the views brighter and more visible, and concurrently, that viewing zone is slightly widened where the stereoscopic vision is enabled. As shown in FIG. 7, according to another advantageous feature of the invention, central views 10 and 11 (one right view and one left view) are printed with increased exposure, causing these views to look brighter than the normally exposed views 8–9 and 12–13 and than the under-exposed views 7 and 14. The viewer then quickly learns to find the place where the left and right views have balanced exposure with high contrast, which is exactly the right position to enable correct perspective correlation.

Reference is made again to FIG. 6 which represents an embodiment of the invention that combines all the above mentioned advantageous features of the invention. In this embodiment, the stereoscopic picture is comprised of two separate stereo pairs (sites 2–9 and sites 12–19).The two stereo pairs are separated by a dark band (sites 10 and 11). Each stereo pair is comprised of views of varying exposure levels (first stereo pair: sites 2 and 9 under-exposed, sites 3–4 and 7–8 normally exposed, and sites 5–6 over-exposed; second stereo pair: sites 12 and 19 under-exposed, sites 13–14 and 17–18 normally exposed, and sites 15–16 over-exposed).

Various known techniques can be used for recording the stereo pairs on the photographic receiver. According to a preferred embodiment, a LVT (Light Valve Technology) writer is used. The LVT printer can be used to print directly on a film to be attached to a lenticular faceplate material after development, or directly on an emulsion layer coated on the rear surface of a lenticular faceplate material. To this end, the methods and apparatus described in the above mentioned U.S. applications, Ser. Nos. 08/195,231 and 885,217 can be used. Advantageously, the teaching of the above mentioned U.S. application, U.S. Pat. No. 5,278,608 can also be used to improve the viewing angle at the desired viewing distance. In particular, a system can be used which determines the number of scan lines for each image of a view based on the resolution of the recording media, the number of or pitch of the lenticules and the number of views desired or necessary to minimize the angular transitions between view. The viewing range is also increased by aligning the image lines with respect to the lenticules such that the image lines can be positioned under adjacent lenticules as the distance from a central viewing position increases.

As an alternative printer, the stereo pairs can be recorded by using a CRT printer. Such a CRT printer, usable for the present invention, has been described in great detail in the above mentioned application, Ser. No. 974,441.

Having described the invention in detail and by reference to the preferred embodiment thereof, it will be apparent that other modifications and variations are possible without departing from the scope of the invention defined in the appended claims.

PARTS LIST

100 Lenticular faceplate material
101 Photographic receiver
102 Adjacent lenticule
103 Reference lenticule
105 Reference lenticule
106 Adjacent lenticule
107 Set of right and left perspective views
108 Black image
110 Arc

What is claimed is:

1. An improved stereoscopic picture comprising;
   (a) a faceplate material having a predetermined number of lenticules, said lenticules having a given pitch and a given subtended primary angle; and
   (b) a receiver mounted on said faceplate material and on which are recorded sets of right and left perspective views of a first pair of stereoscopic pictures, said sets of right and left perspective views being of a given width, said faceplate material and said receiver being aligned so that each set on said receiver corresponds to an associated given lenticule of said faceplate material, said width of said sets of right and left perspective views being less than the pitch of said lenticules;
   wherein two successive sets of right and left perspective views of said first pair of stereoscopic pictures are separated by an unexposed black area of said receiver.

2. An improved stereoscopic picture according to claim 1 wherein said subtended primary angle is at least 20 degrees.

3. A stereoscopic picture according to claim 1 wherein the receiver is a photographic receiver.

4. An improved stereoscopic picture comprising;
   (a) a faceplate material having a predetermined number of lenticules, said lenticules having a given pitch and a given subtended primary angle; and
   (b) a receiver mounted on said faceplate material and on which are recorded sets of right and left perspective views of a first pair of stereoscopic pictures, said sets of right and left perspective views being of a given width, said faceplate material and said receiver being aligned so that each set on said receiver corresponds to an associated given lenticule of said faceplate material, said width of said sets of right and left perspective views being less than the pitch of said lenticules;
   wherein two successive sets of right and left perspective views of said first pair of stereoscopic pictures are separated by an exposed area having information different from said sets of right and left perspective views.

5. An improved stereoscopic picture according to claim 4 wherein said subtended primary angle is at least 20 degrees.

6. A stereoscopic picture according to claim 4 wherein the receiver is a photographic receiver.

7. An improved stereoscopic picture comprising:
   (a) a faceplate material having a predetermined number of lenticules, said lenticules having a given pitch and a given subtended primary angle; and
   (b) a receiver mounted on said faceplate material and on which are recorded sets of right and left perspective views of a first pair of stereoscopic pictures, said sets of right and left perspective views being of a given width, said faceplate material and said receiver being aligned so that each set on said receiver corresponds to an associated given lenticule of said faceplate material;
   wherein each set is comprised of a first subset of right perspective views and a second subset of left perspective views, each of said first and second subsets being formed of varying brightness level views, the brightness level increasing as the viewer moves towards a viewing zone of said stereoscopic picture where a correct perspective correlation is enabled.

8. An improved stereoscopic picture according to claim 6 wherein each of said sets comprises central views and lateral views, at least one central view of each of said sets having a brightness level higher than the brightness level at said viewing zone.

9. An improved stereoscopic picture according to claim 8 wherein at least one lateral view on both sides of each of said sets has a brightness level lower than the brightness level at said viewing zone.

10. An improved stereoscopic picture according to claim 6 wherein two successive sets of right and left perspective views of said first pair of stereoscopic pictures are separated by a set of right and left perspective views of a second pair of stereoscopic pictures.

11. An improved stereoscopic picture according to claim 10 wherein said second pair of stereoscopic pictures consists of graphics.

12. An improved stereoscopic picture according to claim 11 wherein said graphics are comprised of words for describing said first pair of stereoscopic pictures.

13. An improved stereoscopic picture according to claim 11 wherein said graphics are words or symbols used to help the viewer correctly locate said viewing zone.

14. An improved stereoscopic picture according to claim 7 wherein said width of said sets of right and left perspective views being less than the pitch of said lenticules.

15. An improved stereoscopic picture according to claim 14 wherein each of said sets comprises central views and lateral views, at least one central view of each of said sets having a brightness level higher than the brightness level at said viewing zone.

16. An improved stereoscopic picture according to claim 14 wherein at least one lateral view on both sides of each of said sets has a brightness level lower than the brightness level at said viewing zone.

17. A method for producing an improved stereoscopic picture, comprising the step of mounting on a faceplate material having a predetermined number of lenticules of a given pitch and of a given subtended primary angle, a photographic receiver on which are recorded sets of right and left perspective views of a first pair of stereoscopic pictures, said sets of right and left perspective views being of a given width, said faceplate material and said photographic receiver being aligned so that each set on said photographic receiver corresponds to an associated lenticule of said faceplate material, said width of said sets of right and left perspective views being less than the pitch of said lenticules;

wherein two successive sets of right and left perspective views of said first pair of stereoscopic pictures are separated by an unexposed black area of said photographic receiver.

18. A method according to claim 17 wherein said sets of right and left perspective views of said first pair of stereoscopic pictures are recorded on said photographic receiver by means of a CRT printer.

19. A method according to claim 17 wherein said sets of right and left perspective views of said first pair of stereoscopic pictures are recorded on said photographic receiver by means of a LVT film writer.

20. A method according to claim 17 wherein the subtended primary angle is at least 20 degrees.

21. A method for producing an improved stereoscopic picture, comprising the steps of:

(a) recording on a photographic receiver, sets of right and left perspective views of a first pair of stereoscopic pictures, said sets of right and left perspective views being of a given width;

(b) aligning said photographic receiver with respect to a faceplate material having a predetermined number of lenticules of a given pitch so that each set on said photographic receiver corresponds to an associated lenticule of said faceplate material, said width of said sets of right and left perspective views being less than the pitch of said lenticules, wherein two successive sets of right and left perspective views of said first pair of stereoscopic pictures are separated by an exposed area having information different from said sets of right and left perspective views; and (c) fastening said faceplate to said photographic receiver.

22. A method for producing an improved stereoscopic picture, comprising the steps of:

(a) providing a lenticular faceplate material, having a rear surface and a front surface on which are formed a predetermined number of lenticules of a given pitch, with a photosensitive layer on said rear surface; and (b) recording on said photosensitive layer sets of right and left perspective views of a first pair of stereoscopic pictures, said sets of right and left perspective views being of a given width and being recorded in a position such that each set on said photosensitive layer corresponds to a given lenticule of said lenticular faceplate material, said width of said sets of right and left perspective views being less than the width of said lenticules;

each set is comprised of a first subset of right perspective views and a second subset of left perspective views, each of said first and second subsets being formed of varying brightness level views, the brightness level increasing as the viewer moves towards a viewing zone of said stereoscopic picture where a correct perspective correlation is enabled.

23. A method according to claim 22 wherein said sets of right and left perspective views are recorded on said photosensitive layer through said lenticular faceplate material.

24. A method according to claim 22 wherein said sets of right and left perspective views are recorded on said photosensitive layer from the side opposite to said lenticular faceplate material.

25. A method for producing an improved stereoscopic picture, comprising the step of mounting on a faceplate material having a predetermined number of lenticules of a given pitch and of a given subtended primary angle, a photographic receiver on which are recorded sets of right and left perspective views of a first pair of stereoscopic pictures, said sets of right and left perspective views being of a given width, said faceplate material and said photographic receiver being aligned so that each set on said photographic receiver corresponds to an associated lenticule of said faceplate material, said width of said sets of right and left perspective views being less than the pitch of said lenticules;

wherein two successive sets of right and left perspective views of said first pair of stereoscopic pictures are separated by an exposed area having information different from said sets of right and left perspective views.

* * * * *